United States Patent [19]

Roncarolo

[11] 4,289,208
[45] Sep. 15, 1981

[54] DEVICE FOR CONTROLLING AGRICULTURAL IMPLEMENTS MOUNTED ON AN AGRICULTURAL VEHICLE

[75] Inventor: Giuseppe Roncarolo, Modena, Italy

[73] Assignee: Fiat Trattori S.p.A., Modena, Italy

[21] Appl. No.: 37,084

[22] Filed: May 8, 1979

[30] Foreign Application Priority Data

Jul. 12, 1978 [IT] Italy ............................... 68648 A/78

[51] Int. Cl.³ ............................................ A01B 63/111
[52] U.S. Cl. ........................................................ 172/7
[58] Field of Search .......... 280/456 A, 460 A, 461 A, 280/405 B; 172/7, 8, 9, 10, 11, 12

[56] References Cited

U.S. PATENT DOCUMENTS 3,463,511  8/1969  Murphy et al. ................. 280/405 B

FOREIGN PATENT DOCUMENTS 609131  11/1960  Canada ..................................... 172/7
2379977  9/1978  France .................................... 172/7
1034342  6/1966  United Kingdom ............ 280/405 B
534193  1/1977  U.S.S.R. ................................ 172/12

Primary Examiner—John A. Pekar
Attorney, Agent, or Firm—Sughrue, Rothwell, Mion, Zinn & Macpeak

[57] ABSTRACT

A device for controlling an agricultural implement mounted on a tractor includes an auxiliary hydraulic jack which exerts a force on a resiliently flexible bar sufficient to limit the deformation of the bar due to reaction forces, when the implement is in use in a ground-engaging position, thereby acting, through a transmission linkage, on a movable control member of an hydaulic distributor to urge the member into its rest position and return the implement rapidly to its lowered position to achieve an even working of the ground. An adjustable throttle valve meters the operation of the auxiliary jack to maintain a desired working characteristic.

4 Claims, 5 Drawing Figures

DEVICE FOR CONTROLLING AGRICULTURAL IMPLEMENTS MOUNTED ON AN AGRICULTURAL VEHICLE

The present invention relates to devices for controlling agricultural implements mounted on agricultural vehicles.

More particularly the invention is concerned with a device for raising and lowering implements mounted on an agricultural vehicle, of the type comprising:

linkage means for articulation of an implement to a vehicle, adapted to permit vertical movements of the implement in a longitudinal plane relative to the vehicle;

a hydraulic single-acting actuator having a rod connected to the said linkage means, for controlling said vertical movements of the implement;

hydraulic supply means for the actuator;

a hydraulic distributor, interposed between the said supply means and the actuator, for controlling the operation of the said actuator, the distributor having a control member which is movable between a rest position, in which the actuator is not supplied with hydraulic fluid and the implement is lowered, and a working position, in which the actuator is supplied with fluid to effect lifting of the implement;

a resiliently deformable element connected to the linkage means and supported by a fixed structure of the vehicle, such that deformation of said element results from reaction forces transmitted from the ground to the implement, and mechanical transmission means, interposed between the deformable element and the distributor control member to urge said control member into its working position, so as to effect lifting of the implement when the said reaction force exceeds a predetermined value.

Known devices of the aforesaid type, commonly known as "controlled stress devices", have a disadvantage that as soon as the implement carried on the vehicle, for example, a tractor, is raised above the ground as a result of exceeding of the predetermined value of the reaction force applied by the ground to the implement, the deformable element relaxes and effects deactivation of the actuator, thus causing the implement to be re-lowered. In this case, and particularly when the implement carried on the tractor is of a type which does not allow the resilient element to revert to its original state, the re-lowering may not be quick enough to allow the soil to be worked uniformly, for example, to a uniform depth.

An object of the present invention is to provide a device of the type specified above which, following a raising of the implement as a result of exceeding of the said predetermined value of the reaction force, will permit the implement to regain rapidly its initial working position relative to the ground.

According to the present invention there is provided a device of the aforesaid type, characterised in that the device further comprises an auxiliary hydraulic actuator connected to said supply means and to said distributor in such a way that the auxiliary actuator will be operated when the distributor control member is moved into its said working position, the said auxiliary actuator being adapted to act upon the distributor control member to urge the latter into its rest position.

The auxiliary hydraulic actuator serves, therefore, to increase the speed with which the distributor control member returns to its rest position following a relaxation of the deformable element.

Preferably, the auxiliary hydraulic actuator is connected to the hydraulic supply means with the interposition of an adjustable throttle valve, the latter serving to meter the operation of the actuator so as to maintain the desired operating characteristics.

The present invention will now be more particularly described, by way of example, with reference to the accompanying purely diagrammatic drawings, in which.

The embodiments described below are adapted to be mounted on an agricultural tractor having a rear three-point linkage for accessory implements.

Figure 1:
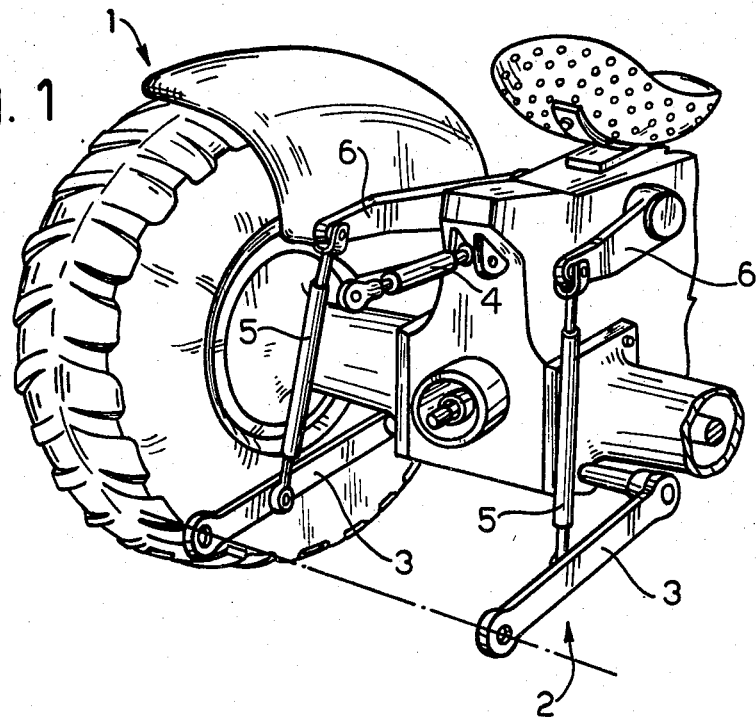
FIG. 1 is a partial perspective view of a linkage for agricultural implements mounted at the rear of an agricultural tractor, to which a control device according to the present invention is applicable.

Referring now to FIG. 1, there is shown a tractor 1 having a three-point linkage 2 comprising a pair of lower linkage arms 3, each connected at one end to the fixed structure of the tractor 1, and an upper linkage arm 4, also connected at one end to the tractor 1. The free ends of the lower arms 3 and the jack 4 are adapted to be linked to an agricultural implement which, in use, is carried by the tractor 1. Each lower arm 3 of the three-point linkage 2 is connected to a respective upper lifting arm 6 by a tie-rod 5 articulated to one end of the respective upper arm 6. The opposite end of each lifting arm 6 is fixed to a respective end of a shaft 7 which is supported by a pair of supports 8 (see FIGS. 2 and 4) fixed to the tractor 1 for rotation about a horizontal transverse axis.

In use, an agricultural implement (not shown) is attached to the lower arms 3, lifting of the implement being effected by rotating the shaft 7 to cause raising of the lower arms 3 through the action of the lifting arms 6 and the tie-rods 5.

Figure 2:
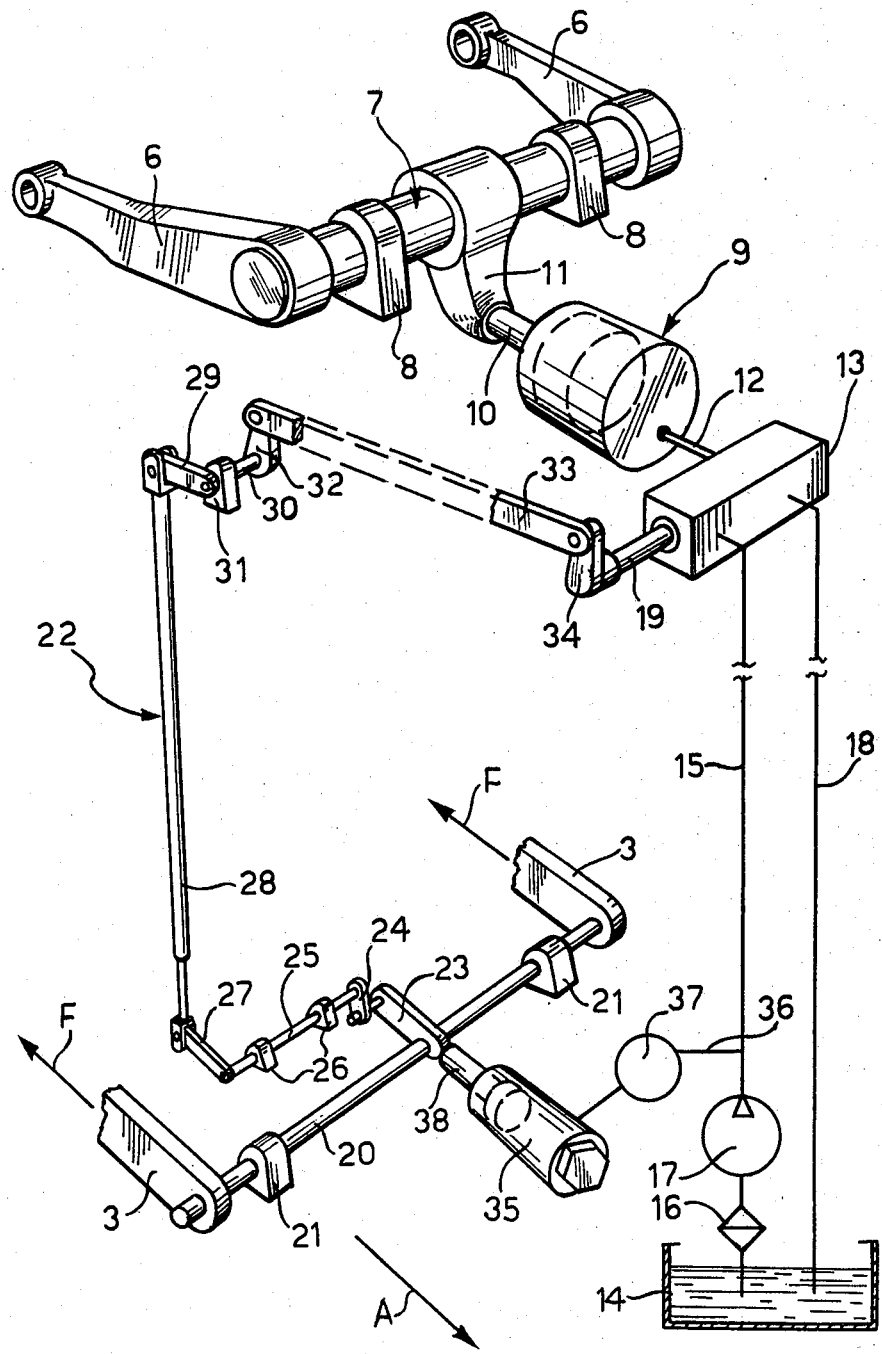
FIG. 2 is a schematic perspective view of a first embodiment of a device for improving the control of an implement, according to the present invention.

Referring now to FIG. 2, there is shown an hydraulic actuator, comprising a single-acting jack 9, which has a rod 10 connected by a support 11, to the shaft 7 for effecting rotation of the latter and, consequently, raising of the lower three-point linkage arms 3. The jack 9 is connected by a pipe 12 to a hydraulic distributor 13 which is connected to a reservoir 14 by a supply pipe 15, fitted with a filter 16 and a pump 17, and a return pipe 18.

The hydraulic distributor 13 is provided with a control member 19 which is movable between a rest position, when the supply pipe 15 communicates with the reservoir 14 through the return pipe 18, and a working position, when the supply pipe 15 communicates with the pipe 12 to allow a supply of hydraulic fluid to enter the jack 9. When the control member 19 is in its rest position the jack 9 is not supplied with hydraulic pressure fluid and the lifting arms 6, on the shaft 7, are in a position which corresponds to a lowered, ground-engaging position of the implement. When the control member 19 is in its working position, the jack 9 is supplied with hydraulic fluid to effect a controlled lifting of the implement by means of the lifting arms 6.

In the rest position of the distributor control member 19 there is a continuous flow of hydraulic fluid through the supply pipe 15 and the return pipe 18. When the member 19 is moved into the working position this flow is interrupted, causing a rapid pressure build-up in the supply pipe 15 to operate the actuator 9.

As is known "controlled stress", devices, the lower arms 3 of the three point linkage 2 are connected to a resiliently flexible bar 20 which is supported for rotation about a transverse horizontal axis, relative to the tractor 1, by a pair of supports 21. Therefore, since the bar 20 is effectively fixed to the implement by the arms 3 and to the tractor 1 by the supports 21, it tends to distort when the implement is in a ground engaging position due to a reaction force or ground drag which is transmitted from the ground to the implement when the tractor 1 is moving in the direction of arrow A in FIG. 2.

The bar 20 is connected to the distributor control member 19 by mechanical transmission means formed by a linkage 22. The linkage 22 comprises a first crank arm 23 fixed at one end to the bar 20 intermediate its ends, and articulated at its other end to one end of a second crank arm 24. The second crank arm 24 is connected at its other end to one end of a first shaft 25 which is rotatably supported on the tractor 1 by a pair of supports 26. The other end of the shaft 25 is connected to one end of a third crank arm 27, the other end of which is articulated to one end of a first link 28. The other end of the link 28 is articulated to one end of a fourth crank arm 29, the other end of which is connected to one end of a second shaft 30. The second shaft 30 is rotatably supported on the tractor 1 by a support 31 and is connected at its other end to one end of a fifth crank arm 32. The fifth crank arm 32 is articulated to one end of a second link 33, the other end of which is articulated to the distributor control member 19 by a sixth crank arm 34.

FIG. 2 shows one example of a mechanical transmission means and it will be appreciated that any mechanical equivalent which is suitable for converting the movement of the bar 20 into a corresponding movement of the distributor control member 19 could be adopted. In the particular case illustrated in FIG. 2, the control member 19 is formed by a shaft which is rotatable about its longitudinal axis, and the transmission linkage 22 could be replaced by any other equivalent transmission means suitable for converting the movement of the bar 20 into a rotation of the control member 19.

As shown in FIG. 2, an auxiliary hydraulic actuator, comprising a jack 35, is connected to the supply pipe 15 by a branch pipe 36 which has an adjustable throttle valve 37. When the distributor control member 19 is in its rest position, with the supply pipe 15 in communication with the reservoir 14 through the return pipe 18, the auxiliary jack 35 is not supplied with hydraulic fluid, however, when the control member 19 is in its working position, the auxiliary jack 35 receives hydraulic fluid from the supply pipe 15 through the branch pipe 36.

The auxiliary jack 35 is provided with a rod 38 which abuts the bar 20 in such a way, the longitudinal axis of which intersects perpendicularly the longitudinal axis of the bar 20 at its mid-point, and is arranged parallel to the direction of travel A of the tractor 1. In other words, the longidutinal axis of the rod 38 of the auxiliary jack 35 is positioned parallel to the direction of travel A of the tractor 1 in the plane in which the bar 20 is deformed due to the reaction force transmitted from the ground to the implement carried by the tractor.

Figure 3:
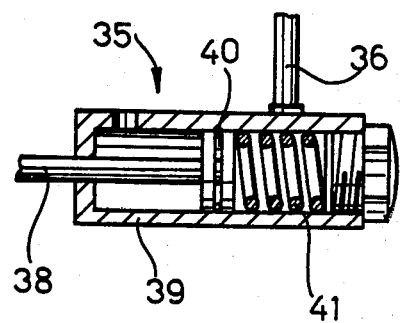
FIG. 3 is a sectional view, on an enlarged scale, of a component part of the device of FIG. 2.

As shown in FIG. 3, the auxiliary jack 35 comprises a cylinder 39 in which a piston 40, attached to the rod 38, is slidable. A spring 41 is located coaxially within the cylinder 39 and acts on the piston 40 so as to keep the free end of the rod 38 in abutment with the bar 20.

The first embodiment of the device, as shown in FIG. 2, operates as follows:

When the implement is in a ground-engaging position, the reaction force transmitted from the ground to the implement as a result of movement of the tractor causes deformation of the resiliently flexible bar 20. The ends of the bar 20 which are connected to the lower arms 3 of the three point towing linkage 2 are subjected to a generally horizontal stress, shown as F in FIG. 2, which induces resilient flexing of the bar, as a result of which the medial zone of the bar 20 tends to move in a substantially horizontal plane in the direction of travel A of the tractor 1.

The flexing deformation of the bar 20 causes a corresponding movement of the distributor control member 19 through the mechanical transmission linkage 22. When the reaction force or drag transmitted from the ground to the implement exceeds a predetermined value, the control member 19 is moved from the rest position, which corresponds to a lowered position of the implement, to its working position in which the supply pipe 15 is put into communication with the pipe 12, thereby supplying hydraulic fluid to the jack 9 and causing the implement to be lifted from the ground. As soon as the implement is raised, the bar 20 relaxes into its undeformed state, and, consequently, the control member 19 returns to its rest position, allowing the implement to be relowered.

In order to render the initiation of this lowering phase more rapid and "sensitive", so as to achieve a substantially uniform working of the ground, hydraulic fluid is also supplied, simultaneously, to the auxiliary jack 35, during the lifting phase. The auxiliary jack 35 exerts, through the rod 38, a force which limits the deformation of the bar 20 induced by an increase in the reaction force. The rod 38 of the auxiliary jack 35 acts, therefore, in a direction which tends to urge the distributor control member 19 into its rest position, through the linkage 22. Consequently, the moment at which the distributor control member 19 returns into its rest position will be anticipated, thereby allowing the implement to be lowered more rapidly to maintain uniform working.

The adjustable throttle valve 37 meters the operation of the auxiliary jack 35 in such way as to maintain the desired operating characteristics.

Figure 4:
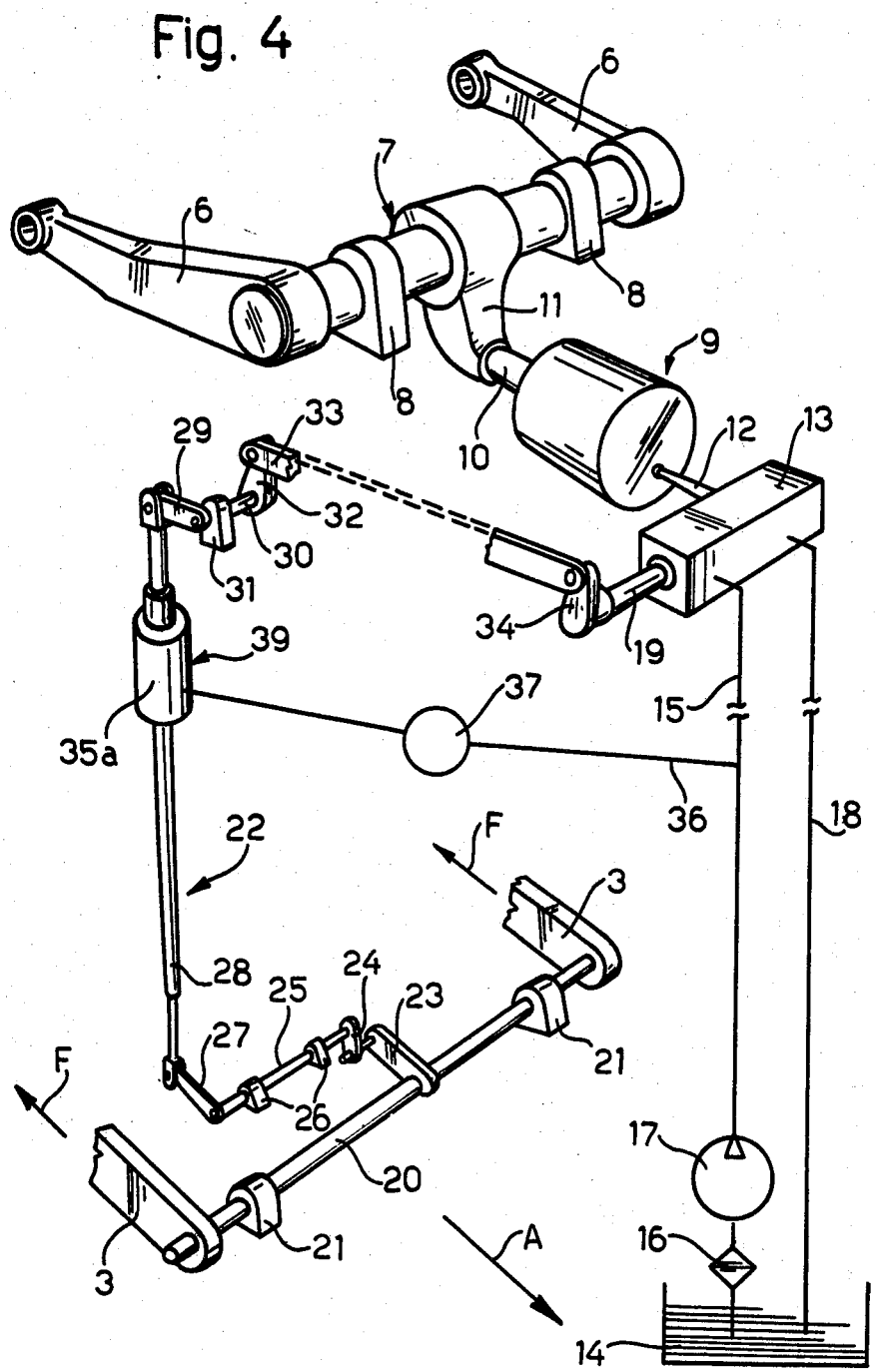
FIG. 4 is a view similar to FIG. 2 of a second embodiment of the device according to the present invention.

Referring now to FIG. 4, the second embodiment of the device differs from that shown in FIG. 2 insofar as the auxiliary hydraulic jack 35a is included within the linkage 22, instead of acting directly on the bar 20, as previously described.

More precisely, as shown in FIG. 4, the auxiliary hydraulic jack 35a comprises a cylinder 39 fixed to the first link 28 of the transmission linkage 22, and a rod 38 connected at its free end to the fourth crank arm 29.

The force necessary to induce deformation of the bar 20 is greater than the force necessary to cause a movement of the distributor control member 19, therefore, when the auxiliary jack 35a, as shown in FIG. 4, is supplied with hydraulic fluid, the cylinder 39 remains stationary while the rod 38 moves to effect a movement of the control member 19. When the bar 20 is deformed, as the result of an increase in the reaction force, however, the auxiliary jack 35a acts as a single body, allowing transmission of the movement of the first link 28 to the fourth crank arm 29.

Figure 5:
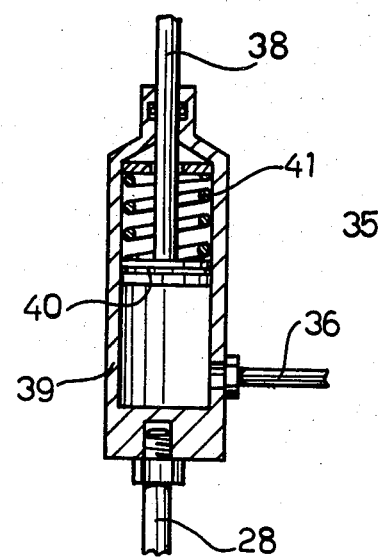
FIG. 5 is a sectional view, on an enlarged scale of a component part of the device of FIG. 4.

As shown in FIG. 5, the auxiliary jack 35a comprises a piston 40 which is fixed to a rod 38 and slidable within a cylinder 39. A coaxial spring 41 surrounds the rod 38 and acts upon the piston 40.

The embodiment of the device shown in FIG. 4 has an advantage over the embodiment of FIG. 2 in that the auxiliary jack 35a of the second embodiment only has to overcome frictional forces which oppose movement of the distributor control member 19. The spring 41 within the auxiliary jack 35a allows for automatic compensation of the play which may occur in the transmission linkage 22 between the bar 20 and the auxiliary jack 35a.

In the device described above the resiliently deformable element, the bar 20, acts as a sensor for the reaction force transmitted from the ground to the implement, and it will be appreciated that the principle of the invention will also be applicable to a device in which the resiliently deformable element, instead of being connected to the lower arms 3 of the three point linkage 2, is connected to the upper jack 4 of the linkage.

What we claim is:

1. Device for controlling agricultural implements mounted on agricultural vehicles, comprising, in combination:

linkage means for articulation of said implement to said vehicle, adapted to permit vertical movement of said implement in a longitudinal plane relative to said vehicle;

a hydraulic single-acting actuator having a rod connected to said linkage means for controlling said vertical movement;

hydraulic supply means for said actuator;

a hydraulic distributor, interposed between said supply means and said actuator, for controlling the operation of said actuator, said distributor having a control member movable between a rest position, in which said actuator is not supplied with hydraulic fluid and said implement is lowered, and a working position, in which said actuator is supplied with hydraulic fluid to effect lifting of said implement;

a resiliently deformable element connected to said linkage means, and supported by a fixed structure of said vehicle, such that the deformation of said deformable element results from reaction forces transmitted from the ground to said implement, and mechanical transmission means interposed between said deformable element and said distributor control member, to urge said control member into its working position, so as to effect lifting of said implement when said reaction force exceeds a predetermined value, wherein the improvement consists in said device further comprising:

an auxiliary hydraulic actuator, means connecting said actuator to said supply means and to said distributor whereby the said auxiliary actuator will be operated when said distributor control member is moved into its said working position, said auxiliary actuator being included in said mechanical transmission means which connects said resilient bar to said distributor control member so as to urge said distributor control member into its said rest position.

2. Device as defined in claim 1, wherein said auxiliary actuator is connected to said supply means through an adjustable throttle valve.

3. Device as defined in claim 1, wherein said linkage means include two lower linkage arms, and said deformable element comprises a resiliently flexible bar connected at each end to a respective lower arm and supported for rotation about a transverse horizontal axis by said fixed structure of said vehicle.

4. Device as defined in claim 1, wherein said auxiliary hydraulic actuator comprises a single-acting hydraulic jack having a cylinder fixed to one element of said transmission means, and a rod fixed to another element of said transmission means.

* * * * *